United States Patent
Yu

(10) Patent No.: US 9,971,639 B2
(45) Date of Patent: May 15, 2018

(54) METHOD FOR PROCESSING DATA AND ELECTRONIC DEVICE THEREFOR

(71) Applicant: Samsung Electronics Co., Ltd., Gyeonggi-do (KR)

(72) Inventor: Kyong-Yong Yu, Seoul (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 14/818,967

(22) Filed: Aug. 5, 2015

(65) Prior Publication Data

US 2016/0041864 A1    Feb. 11, 2016

(30) Foreign Application Priority Data

Aug. 5, 2014 (KR) .................. 10-2014-0100502

(51) Int. Cl.
*G06F 11/00* (2006.01)
*G06F 11/07* (2006.01)
*G06F 11/32* (2006.01)

(52) U.S. Cl.
CPC ........ *G06F 11/0772* (2013.01); *G06F 11/327* (2013.01); *G06F 11/0706* (2013.01)

(58) Field of Classification Search
CPC .. G06F 11/0772; G06F 11/2294; G06F 11/02; G06F 11/0748; G06F 11/32; G03G 15/552
USPC ................................. 714/46, 45, 57
See application file for complete search history.

(56) References Cited

U.S. PATENT DOCUMENTS

| | | | | |
|---|---|---|---|---|
| 5,630,125 | A * | 5/1997 | Zellweger | ......... G06F 17/30994 |
| 5,897,622 | A * | 4/1999 | Blinn | ...................... G06Q 30/06 |
| | | | | 705/26.81 |
| 5,944,790 | A * | 8/1999 | Levy | .................. G06F 17/30905 |
| | | | | 707/E17.121 |
| 6,292,894 | B1 * | 9/2001 | Chipman | ............ G06F 17/3061 |
| | | | | 707/E17.058 |
| 6,484,149 | B1 * | 11/2002 | Jammes | .............. G06F 17/3089 |
| | | | | 705/26.62 |
| 2014/0059531 | A1 | 2/2014 | Lee et al. | |

* cited by examiner

*Primary Examiner* — Dieu-Minh Le
(74) *Attorney, Agent, or Firm* — The Farrell Law Firm, P.C.

(57) ABSTRACT

Methods and devices are provided in which generation of an error is identified while a function of a program is performed. A message is displayed relating to existence of a solution corresponding to the error.

19 Claims, 9 Drawing Sheets

METHOD FOR PROCESSING DATA AND ELECTRONIC DEVICE THEREFOR

PRIORITY

This application claims priority under 35 U.S.C. § 119(a) to Korean Application Serial No. 10-2014-0100502, which was filed in the Korean Intellectual Property Office on Aug. 5, 2014, the content of which is incorporated herein by reference.

BACKGROUND OF THE INVENTION

1. Field of the Invention

The present invention relates generally to data processing in electronic devices, and more particularly, to a method of processing an error generated in an electronic device and an electronic device therefor.

2. Description of the Related Art

An electronic device may include at least one program in a memory, and an installed program may generate an error while processing data. The electronic device may solve the generated error by applying solution data (e.g., update data, hotfix, and the like).

In order to obtain distributed update data, the electronic device 101 may update the program from a server. Specifically, the electronic device may stop the program that is being used and apply the obtained solution data by updating the program.

In order to correct a function, an error, a program installed in the electronic device, an update is frequently provided. The provided update is often forcibly performed, and thus, the update may be an inconvenient element to a user in using a service. Specifically, for a program that provides a service, the update may be the reason for breaking away from the program. For example, when an error is generated upon entering a payment function, an update for the corresponding program may be forcibly performed. However, when a user is only using free content, the user may be required to perform an update in order to use a program even though the user does not use a payment function.

SUMMARY OF THE INVENTION

The present invention has been made to address at least the above problems and/or disadvantages and to provide at least the advantages described below. Accordingly, an aspect of the present invention provides a method of processing an error in an electronic device.

According to an aspect of the present invention, electronic device is provided that includes a display and a processor. The processor is configured to identify generation of an error while a function of a program is performed, and configured to control the display to display a message relating to existence of a solution corresponding to the error.

According to another aspect of the present invention, a method is provided for operating an electronic device. A processor of the electronic device identifies generation of an error while a function of a program is performed. A display of the electronic device displays a message relating to existence of a solution corresponding to the error.

According to another aspect of the present invention, a computer-readable storage medium in which a program for performing operations is stored is provided. The operations include: identifying generation of an error while a function of a program is performed; and displaying, on a display, a message relating to existence of a solution corresponding to the error.

BRIEF DESCRIPTION OF THE DRAWINGS

The above and other aspects, features, and advantages of certain embodiment of the present invention will be more apparent from the following detailed description when taken in conjunction with the accompanying drawings, in which.

DETAILED DESCRIPTION

Figure 1:
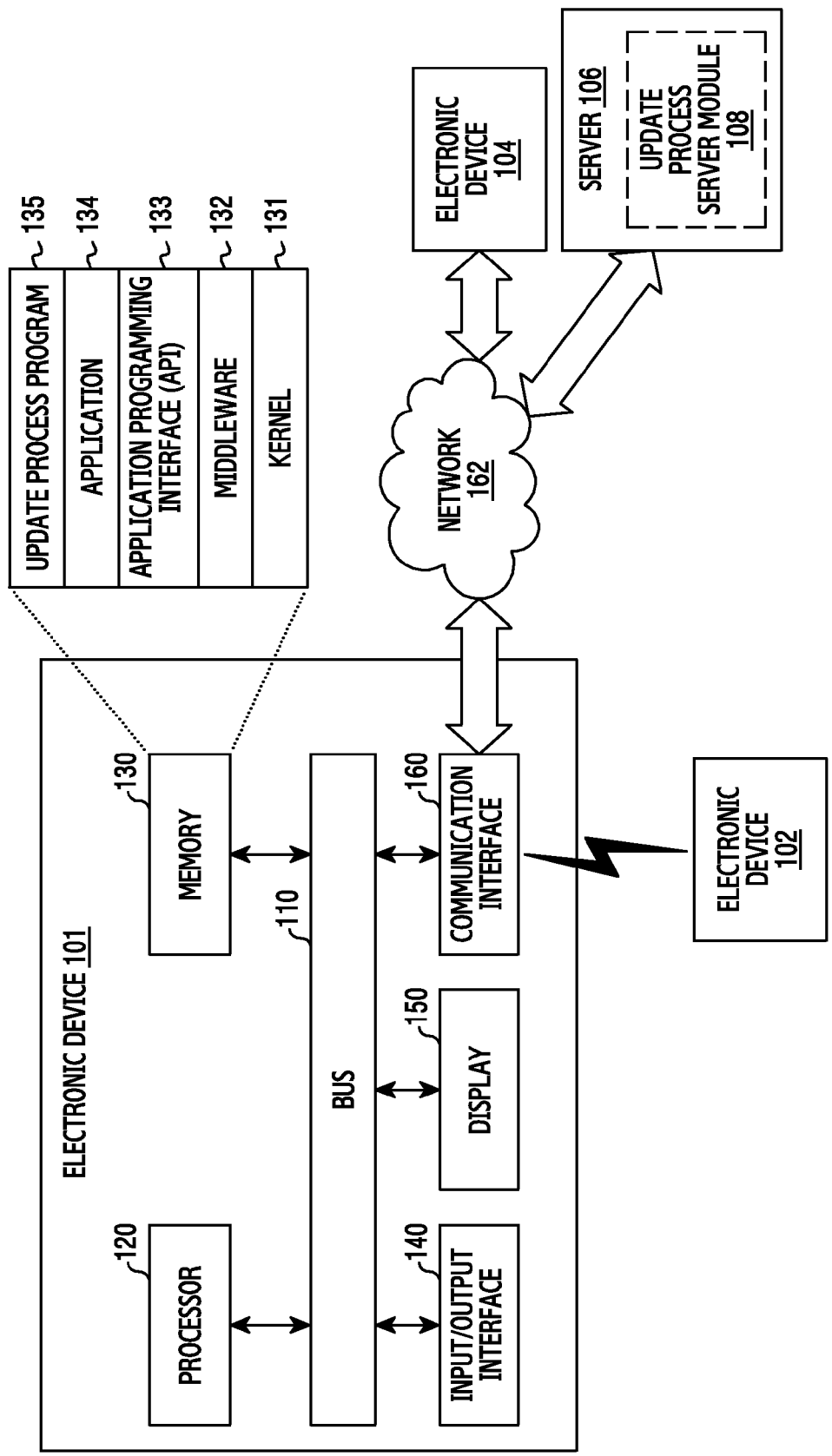
FIG. 1 is a diagram illustrating a network environment including an electronic device, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Herein, the terms "include" or "may include", which may be used in various embodiments of the present invention, refer to the presence of disclosed functions, operations, or elements, and do not restrict the addition of one or more additional functions, operations or elements. Further, as used in various embodiments of the present invention, the terms "include", "have", and their conjugates are intended to denote a certain feature, numeral, step, operation, element, component, or a combination thereof, and should not be construed to exclude the existence of or a possibility of one or more additional features, numerals, steps, operations, elements, components, or combinations thereof.

Further, as used in various embodiments of the present invention, the expression "or" includes any or all combinations of words enumerated together. For example, the expression "A or B" or "at least one of A and B" may include A, may include B, or may include both A and B.

Herein, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both are user devices. Additionally, without departing from the scope of the present invention, a first component element may be referred to as a second component element. Similarly, the second component element may be referred to as the first component element.

When an element is referred to as being "coupled" or "connected" to any other element, it should be understood that the element may be coupled or connected directly to the other element, or a third element may be interposed therebetween. Contrarily, when an element is referred to as being "directly coupled" or "directly connected" to any other element, it should be understood that no element is interposed therebetween.

The terms, as used herein, describe a certain embodiment and are not intended to limit the present invention. As used herein, singular forms may include plural forms as well unless the context explicitly indicates otherwise. Furthermore, all terms used herein, including technical and scientific terms, have the same meanings as those commonly understood by those of skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined herein.

An electronic device, according to embodiments of the present invention, may be a device that includes a fingerprint recognition sensor. The electronic device, according to various embodiments of the present invention, may be embodied as, for example, at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mount-device (HMD) such as electronic glasses, electronic clothing, an electronic bracelet, an electronic necklace, an electronic appcessory, an electronic tattoo, or a smart watch), a television, a digital versatile disc (DVD) player, an audio player, a refrigerator, an air conditioner, a vacuum cleaner, an oven, a microwave oven, a washing machine, an air cleaner, a set-top box, a TV box, a game console, an artificial intelligence robot, a television (TV), an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter). An electronic device, according to embodiments of the present invention, may be a device including a communication function. The electronic device, according to various embodiments of the present invention, may be a combination of one or more of the aforementioned various devices. Further, the electronic device, according to various embodiments of the present invention, may be a flexible device. Further, it will be apparent to those skilled in the art that the electronic device, according to various embodiments of the present invention, is not limited to the aforementioned devices.

The term "user", as used herein, may indicate a person who uses an electronic device or a device (e.g., artificial intelligence electronic device) that uses an electronic device.

An electronic device, according to various embodiments of the present invention, is described herein with reference to the accompanying drawings.

FIG. 1 is a diagram illustrating a network environment including an electronic device, according to an embodiment of the present invention.

Referring to FIG. 1, an electronic device 101 includes at least one of a bus 110, a processor 120, a memory 130, an input/output interface 140, a display 150, and a communication interface 160.

The bus 110 may be a circuit that connects the aforementioned elements to each other and transmits communication signals (e.g., control messages) between the aforementioned elements.

The processor 120 may, for example, receive commands from the above-mentioned other elements (e.g., the memory 130, the input/output interface 140, the display 150, and the communication interface 160) via the bus 110, interpret the received commands, and perform calculations or data processing according to the interpreted commands.

The processor 120 may be included in the electronic device 101 to perform a predetermined function of the electronic device 101. According to an embodiment of the present invention, the processor 120 may include one or more application processors (APs) and one or more micro controller units (MCUs). According to another embodiment of the present invention, the processor 120 may include one or more MCUs as applications, or may be functionally connected to one or more MCUs. In FIG. 1, the APs and the MCUs may be included in one IC package, or may be separately configured to be included in different IC packages, respectively. According to an embodiment of the present invention, the MCUs may be included in an IC package together with the APs. Although the processor 120 includes the APs or the MCUs, it is apparent that the processor 120 may also perform operations of the APs and/or the MCUs.

The APs may drive an operating system or an application program to control a plurality of hardware or software elements connected thereto, and may process various types of data including multimedia data and perform calculations. The APs may be implemented by, for example, a System on Chip (SoC). According to an embodiment of the present invention, the processor 120 may further include a graphic processing unit (GPU).

The MCUs may be a processors configured to perform a predetermined operation. According to an embodiment of the present invention, the MCU may obtain sensing information through one or more designated motion sensors (for example, a gyro sensor, an acceleration sensor, or a geomagnetic sensor), may compare obtained sensing information, and may determine a motion state of a designated sensor with reference to a database of the electronic device 101.

According to an embodiment of the present invention, the AP or the MCU may load a command or data received from at least one of a non-volatile memory or other components connected to each of the AP and the MCU in a volatile memory, and may process the loaded command or data. Furthermore, the APs or the MCUs may store data received from or generated by at least one of the other elements in a non-volatile memory.

The memory 130 may store commands or data received from the processor 120 or other elements (e.g., the input/output interface 140, the display 150, and the communication interface 160) or generated by the processor 120 or the other elements. The memory 130 may include programming modules, for example, a kernel 131, middleware 132, an application programming interface (API) 133, an application 134, and the like. Each of the programming modules may be formed of software, firmware, or hardware, or a combination of two or more thereof.

The kernel 131 may control or manage the system resources (e.g., the bus 110, the processor 120, and the memory 130) used to execute operations or functions implemented in the remaining programming modules, for example, the middleware 132, the API 133, and the applications 134. Also, the kernel 131 may provide an interface to the middleware 132, the API 133, or the application 134, so as to access each component element of the electronic device 101 for controlling or managing.

The middleware 132 may act as an intermediary so as to allow the API 133 or the application 134 to communicate with and exchange data with the kernel 131. Further, for operation requests received from the application 134, the middleware 132 may control the operation requests (for example, perform scheduling or load balancing) by using, for example, a method of prioritizing at least one of the applications 134 in using system resources (for example, the bus 110, the processor 120, the memory 130, or the like) of the electronic device 101.

The API 133 is an interface used by the application 134 to control a function provided from the kernel 131 or the middleware 132, and may include, for example, at least one interface or function (for example, an instruction) for a file control, a window control, image processing, a character control, or the like.

The application (or processor) 134 may include a short message service (SMS)/multimedia messaging service (MMS) application, an e-mail application, a calendar application, an alarm application, a health care application (e.g., application for monitoring physical activity or blood glucose), and an environmental information application (e.g., application for providing atmospheric pressure, humidity, or temperature information). The application (or processor) 134 may correspond to an application associated with information exchange between the electronic device 101 and an external electronic device (e.g. first external electronic device 102 or second external electronic device 104). The application associated with exchanging information may include, for example, a notification relay application for transferring predetermined information to the first or second external electronic device 102 or 104 or a device management application for managing the first or second external electronic device 102 or 104. The notification relay application may include, for example, a function of transferring, to the second external electronic device 104, notification information generated by other applications (e.g., an SMS/MMS application, an e-mail application, a health management application, or an environmental information application) of the electronic device 101. Additionally or alternatively, the notification relay application may receive notification information from, for example, the second external electronic device 104 and provide the received notification information to a user. For example, the device management application may manage (e.g., install, delete, or update) functions for at least a part of the second external electronic device 104 communicating with the electronic device 101 (e.g., turning on/off the second external electronic device 104 itself (or some elements thereof) or adjusting brightness (or resolution) of a display), applications operating in the second external electronic device 104, or services (e.g., a telephone call service or a message service) provided from the second external electronic device 104. According to an embodiment of the present invention, the application 134 may include an application designated according to the attribute (e.g., the type) of the first or second external electronic device 102 or 104. For example, when the external electronic device is an MP3 player, the application 134 may include an application related to the reproduction of music. Similarly, when the external electronic device is a mobile medical appliance, the application 134 may include an application related to health care. According to an embodiment of the present invention, the application 134 may include at least one of an application designated to the electronic device 101 and an application received from the second external electronic device or a server 106. An update process program 135 may be provided in the application 134, or may be stored in the memory 130 as a separate program.

The update process program 135 may identify an error type corresponding to an error detected during the function performance of the program, and may display a message (a notice, or a notice message) on the existence of a solution corresponding to the error based on the error type. Here, in displaying the message for the existence of the solution, the message is not limited to text, and the message may be displayed as an icon or an image.

When a function is performed although the error is not solved, the update process program 135 may display a message in a position where an operation of the program is not disturbed. According to an embodiment of the present invention, the update process program 135 may identify generation of an error while a function of a program is performed, and display a message for the existence of a solution corresponding to the error, on a display. The update process program 135 may change a position where the message is displayed, when the update process program 135 continuously performs the function while the error is generated. The update process program 135 may display the message in a notice bar of the display. The update process program 135 may divide the error into an identified error, of which a solve method is specified correspondingly to an error code, or an unidentified error, of which a solve method is not specified. The update process program 135 may determine whether the solution provided corresponding to the error is applied. The update process program 135 may change a position where the message is displayed, when the program is restarted or when the function is required to apply the solution. The update process program 135 may request information on the solution determined based on at least one of a code of the error, a generation time of the error, and data processed at a detection time of the error, when the error is an unidentified error. The update process program 135 may apply the solution when the update process program 135 selects the message. The update process program 135 may display the message on a portion of the program or a new layer, when application of the solution is necessary to continuously perform the function. The update process program 135 may determine at least one of a hotfix related to the error, an installation of update data, and a connection to an Internet page related to the error, as the solution.

The input/output interface 140 may transfer instructions or data, input from a user through an input/output device (e.g., various sensors, such as an acceleration sensor or a gyro sensor, and/or a device such as a keyboard or a touch screen), to the processor 120, the memory 130, or the communication interface 160 through the bus 110. For example, the input/output interface 140 may provide the processor 120 with data on a user's touch input through a touch screen. Furthermore, the input/output interface 140 may output instructions or data, received from, for example, the processor 120, the memory 130, or the communication interface 160 via the bus 110, through an output unit (e.g., a speaker or the display 150). For example, the input/output interface 140 may output voice data processed by the processor 120 to a user through a speaker.

The display 150 may display various pieces of information (for example, multimedia data or text data) to a user. In addition, the display 150 may be configured as a touch screen in which an input means is directly or approximately touched to input a command.

The communication interface 160 may establish a communication connection between the electronic device 101 and the second electronic device 104 or the server 106. For example, the communication interface 160 may be connected to a network 162 through wireless communication or wired communication, and may communicate with an external device. The wireless communication may include at least one of, for example, Wi-Fi, Bluetooth (BT), near field communication (NFC), a global positioning system (GPS) and cellular communication (e.g. Long Term Evolution (LTE), LTA-Advanced (LTE-A), Code Division Multiple Access (CDMA), Wideband CDMA (WCDMA), Universal Mobile Telecommunications Service (UMTS), Wireless Broadband (WiBro), Global System for Mobile communication (GSM), etc.). Also, the wired communication may include at least one of, for example, a universal serial bus (USB), a high definition multimedia interface (HDMI), Recommended Standard 232 (RS-232), and a plain old telephone service (POTS).

According to an embodiment of the present invention, the network 162 may be a communication network. The communication network may include at least one of a computer network, the Internet, the Internet of things, and a telephone network. According to an embodiment of the present invention, at least one of the application 134, the application programming interface 133, the middleware 132, the kernel 131, and the communication interface 160 may support a protocol (for example, transport layer protocol, data link layer protocol, or physical layer protocol) for communication between the electronic device 101 and an external device.

According to an embodiment of the present invention, the server 106 may support the driving of the electronic device 101 by performing at least one of the operations (or functions) implemented by the electronic device 101. For example, the server 106 may include the processor 120 that controls the electronic device 101 to perform various embodiments of the present disclosure to be described below or a server module that may support a particular module designated to perform the various embodiments. For example, the server module may include at least one element of the processor 120, or the specific module to perform at least one operation of the operations performed by the processor 120, or the specific module (for example, perform the operation on behalf of the processor 120 or the specific module). According to an embodiment of the present invention, the server module may be embodied as an update process server module 108. The update process server module 108 may receive information, such as a version of a specific program, an existence-or-not of update data (e.g., version up data or hotfix, which is periodically updated, hereinafter, hotfix), and an error code. The update process server module 108 may determine whether there is data corresponding to information received from the electronic device 101 through the server 106 or another electronic device connected to the server 106, based on the received information, and may obtain corresponding data. The update process server module 108 may transmit the obtained data to the electronic device 101.

Figure 2:
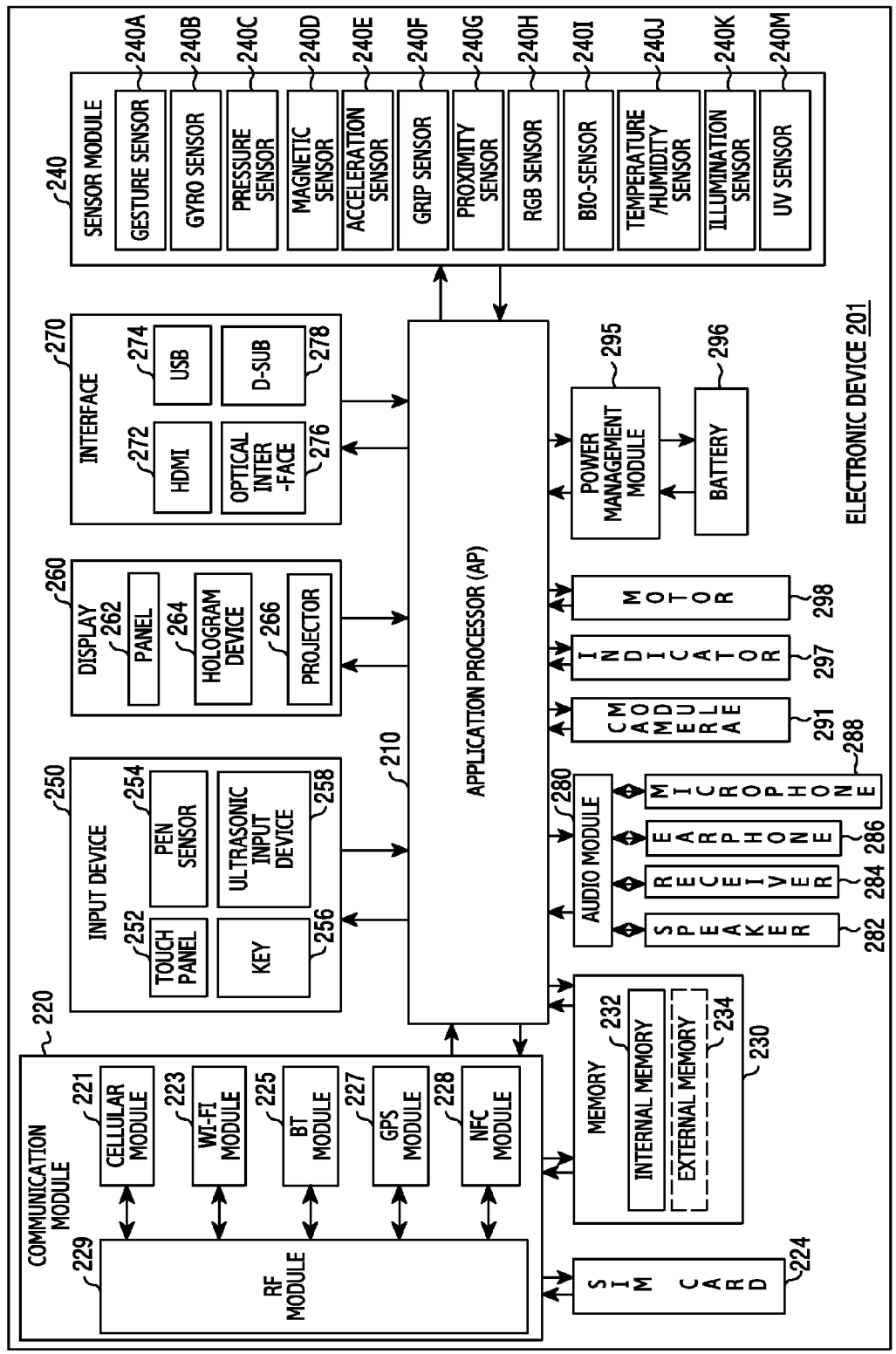
FIG. 2 is a block diagram illustrating the electronic device, according to an embodiment of the present invention.

FIG. 2 is a block diagram illustrating an electronic device, according to an embodiment of the present invention.

An electronic device 201 may include, for example, the entirety or a part of the electronic device 101 of FIG. 1, or may expand all or some elements of the electronic device 101. Referring to FIG. 2, the electronic device 201 includes at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may be included in the electronic device 101 to perform a predetermined function of the electronic device 101. According to an embodiment of the present invention, the AP 210 may include one or more APs and one or more MCUs. According to another embodiment of the present invention, the processor 210 may include one or more MCUs as applications, or may be functionally connected to one or more MCUs. In FIG. 2, the APs and the MCUs may be included in one IC package, or may be separately configured to be included in different IC packages, respectively. According to an embodiment of the present invention, the MCUs may be included in an IC package of the APs to be configured as one IC package together with the APs. Although the AP 210 includes the APs or the MCUs, it is only an embodiment for clear understanding, and it is apparent that the AP 210 may also perform operations of the APs and/or the MCUs.

According to an embodiment of the present invention, the MCUs may acquire sensing information through one or more specified motion sensors (e.g., a gyro sensor 240B, an acceleration sensor 240E, or a geomagnetic sensor, compare the acquired sensing information, and determine the operating state of the specified sensor (e.g., the geomagnetic sensor) by making reference to a database of the electronic device 101. In addition, although the MCUs and the elements of the sensor module 240 are illustrated as separate elements in FIG. 2, the MCUs may be implemented to include at least some of the elements of the sensor module 240 (e.g., at least one of the gyro sensor 240B, the acceleration sensor 240E, and the geomagnetic sensor).

According to an embodiment of the present invention, the AP or the MCU may load a command or data received from at least one of a non-volatile memory or other components connected to each of the AP and the MCU in a volatile memory, and may process the loaded command or data.

Furthermore, the APs or the MCUs may store data received from or generated by at least one of the other elements in a non-volatile memory.

The communication module 220 (e.g., the communication interface 160) may perform data transmission/reception in communication between the electronic device 101 and the other electronic devices (e.g., the first or second external electronic device 102 or 104, or the server 106) connected thereto through a network. According to an embodiment of the present invention, the communication module 220 may include a cellular module 221, a Wi-Fi module 223, a BT module 225, a GPS module 227, an NFC module 228, and a radio frequency (RF) module 229.

The cellular module 221 may provide a voice call service, a video call service, a text message service, or an Internet service through a communication network (e.g., LTE, LTE-A, CDMA, WCDMA, UMTS, WiBro, or GSM). Furthermore, the cellular module 221 may distinguish between and authenticate electronic devices within a communication network using, for example, a subscriber identification module (e.g., the SIM card 224). According to an embodiment of the present invention, the cellular module 221 may perform at least some of the functions that the AP 210 may provide. For example, the cellular module 221 may perform at least some of the multimedia control functions.

According to an embodiment of the present invention, the cellular module 221 may include a communication processor (CP). Further, the cellular module 221 may be implemented by, for example, an SoC. Although the elements such as the cellular module 221 (e.g., a communication processor), the memory 230, and the power management module 295 are illustrated to be separate from the AP 210 in FIG. 2, the AP 210 may include at least some of the aforementioned elements (e.g., the cellular module 221) according to an embodiment of the present invention.

According to an embodiment of the present invention, the AP 210 or the cellular module 221 (e.g., the communication processor) may load instructions or data, received from a non-volatile memory or at least one of the other elements connected thereto, to a volatile memory and process the loaded instructions or data. Furthermore, the AP 210 or the cellular module 221 may store data received from or generated by at least one of the other elements in a non-volatile memory.

The Wi-Fi module 223, the BT module 225, the GPS module 227, and the NFC module 228 may include a processor for processing data transmitted/received through the corresponding module. In FIG. 2, the cellular module 221, the WiFi module 223, the BT module 225, the GPS module 227, and the NFC module 228 are illustrated as separate blocks. However, according to an embodiment of the present invention, at least some (e.g., two or more) of the cellular module 221, the WiFi module 223, the BT module 225, the GPS module 227, and the NFC module 228 may be included in one IC or one IC package. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, RF signals. The RF module 229 may, for example, include a transceiver, a power amp module (PAM), a frequency filter, a low noise amplifier (LNA), or the like. In addition, the RF module 229 may further include an element for transmitting/receiving electronic waves over free air space in wireless communication, for example, a conductor, a conducting wire, or the like. In FIG. 2, the cellular module 221, the Wi-Fi module 223, the BT module 225, the GPS module 227, and the NFC module 228 share one RF module 229. However, according to an embodiment, at least one of them may transmit/receive an RF signal through a separate RF module.

The SIM card 224 may be a card including a SIM, and may be inserted into a slot formed in a predetermined location of the electronic device. The SIM card 224 may include unique identification information (e.g., an integrated circuit card identifier (ICCID)) or subscriber information (e.g., an international mobile subscriber identity (IMSI)).

The memory 230 (e.g., the memory 130) includes an internal memory 232 and/or an external memory 234. The internal memory 232 may include at least one of a volatile memory (e.g., a dynamic random access memory (DRAM), a static RAM (SRAM), a synchronous DRAM (SDRAM), or the like) or a non-volatile memory (e.g., a programmable read only memory (PROM), an erasable and programmable ROM (EPROM), a one-time PROM (OTPROM), an electrically erasable and programmable ROM (EEPROM), a mask ROM, a flash ROM, a NAND flash memory, a NOR flash memory, or the like).

According to an embodiment of the present invention, the internal memory 232 may be a solid state drive (SSD). The external memory 234 may further include a flash drive, for example, a compact flash (CF), a secure digital (SD), a micro-SD, a mini-SD, an extreme digital (xD), a memory stick, or the like. The external memory 234 may be functionally connected to the electronic device 201 through various interfaces. According to an embodiment of the present invention, the electronic device 201 may further include a storage device (or storage medium) such as a hard disc drive.

The sensor module 240 may measure a physical quantity or sense an operating state of the electronic device 201, and may convert the measured or sensed information into an electric signal. The sensor module 240 includes at least one of, for example, a gesture sensor 240A, the gyro sensor 240B, an atmospheric pressure sensor 240C, a magnetic sensor 240D, the acceleration sensor 240E, a grip sensor 240F, a proximity sensor 240G, a color sensor 240H (e.g., red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 240 may further include a control circuit for controlling one or more sensors included therein.

The input device 250 may include a touch panel 252, a (digital) pen sensor 254, a key 256, or an ultrasonic input device 258. The touch panel 252 may recognize a touch input in at least one of, for example, a capacitive type, a resistive type, an infrared type, and an acoustic wave type. The touch panel 252 may further include a control circuit. In case of the capacitive type touch panel, physical contact or proximity detection is possible. The touch panel 252 may further include a tactile layer. In this case, the touch panel 252 may provide a user with a tactile reaction.

The (digital) pen sensor 254 may be implemented, for example, using the same or a similar method to receiving a user's touch input or using a separate recognition sheet. The key 256 may include, for example, a physical button, an optical key, or a keypad. The ultrasonic input device 258 may identify data by detecting an acoustic wave with a microphone (e.g., a microphone 288) of the electronic device 201 through an input unit generating an ultrasonic signal, and may perform wireless detection. According to an embodiment of the present invention, the electronic device 201 may also receive a user input from an external device (e.g., a computer or server) connected thereto using the communication module 220.

The display 260 (e.g., the display 150) includes a panel 262, a hologram device 264, and/or a projector 266. The panel 262 may be, for example, a liquid crystal display (LCD), an active matrix organic light emitting diode (AM-OLED), or the like. The panel 262 may be implemented to be, for example, flexible, transparent, or wearable. The panel 262 may be formed as a single module together with the touch panel 252. The hologram device 264 may show a three dimensional image in the air using an interference of light. The projector 266 may display an image by projecting light onto a screen. The screen may be located, for example, in the interior of or on the exterior of the electronic device 201. According to an embodiment of the present invention, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an Infrared Data Association (IrDA) standard interface.

The audio module 280 may bilaterally convert a sound and an electrical signal. The audio module 280 may process voice information input or output through, for example, a speaker 282, a receiver 284, earphones 286, or the microphone 288. The camera module 291 is a device for capturing still and moving images, and may include one or more image sensors (e.g., a front sensor or a rear sensor), a lens, an image signal processor (ISP, or a flash (e.g., an LED or a xenon lamp, not illustrated), according to an embodiment of the present invention.

The power management module 295 may manage the power of the electronic device 201. The power management module 295 may include, for example, a power management integrated circuit (PMIC), a charger IC, or a battery or fuel gauge. According to an embodiment of the present invention, the PMIC may be mounted to an integrated circuit or an SoC semiconductor. The charging methods may be classified into wired charging and wireless charging. The charger IC may charge a battery and may prevent an overvoltage or excess current from being induced, or flowing from, a charger.

According to an embodiment of the present invention, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a residual quantity of the battery 296, and a voltage, a current, or a temperature while charging. The battery 296 may store or generate electricity and may supply power to the electronic device 201 using the stored or generated electricity. The battery 296 may include, for example, a rechargeable battery or a solar battery.

The indicator 297 may display a specific state of the electronic device 201 or a part thereof (e.g., the AP 210), for example, a boot-up state, a message state, or a state of charge (SOC). The motor 298 may convert an electrical signal into a mechanical vibration. Although not illustrated, the electronic device 201 may include a processing device (e.g., a GPU) for supporting mobile TV. The processing unit for supporting mobile TV may process, for example, media data pursuant to a certain standard of digital multimedia broadcasting (DMB), digital video broadcasting (DVB), or media flow.

Each of the above described elements of the electronic device, according to an embodiment of the present invention, may include one or more components, and the name of a corresponding element may vary according to the type of electronic device. The electronic device, according to an embodiment of the present invention, may include at least one of the above described elements and may exclude some of the elements or further include other additional elements. Further, some of the elements of the electronic device, according to an embodiment of the present invention, may be coupled to form a single entity while performing the same functions as those of the corresponding elements before the coupling.

Figure 3:
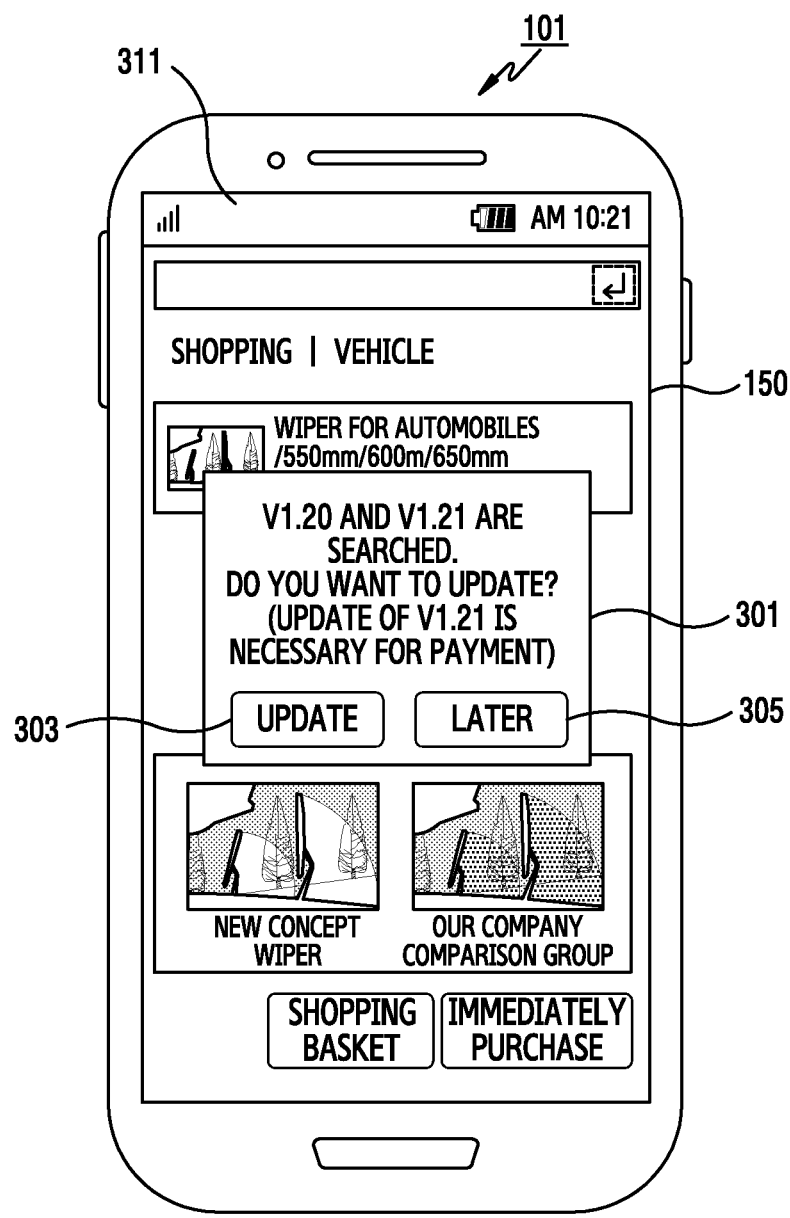
FIG. 3 is a diagram illustrating an electronic device displaying a determination of whether a program update is to be performed, according to an embodiment of the present invention.

FIG. 3 is a diagram illustrating an electronic device displaying a determination of whether a program update is to be performed, according to an embodiment of the present invention.

Referring to FIG. 3, when the electronic device 101 calls (or executes) a specific program included in the memory 130, the electronic device 101 may search for a hotfix of which an update is necessary, by accessing a specific server (e.g., the server 106). Alternatively, when the electronic device 101 operates a specific program, the electronic device 101 may determine that an update is necessary when a specific function is performed. According to an embodiment of the present invention, in determining whether an update is necessary while the program is operated, the electronic device 101 may determine that the update is necessary when a use expires because an expiration is configured to a specific function in a program. Alternatively, when an error is generated during a program operation, the electronic device 101 may receive information on a hotfix from a server to determine that an update is necessary, by accessing the server to request a solution (e.g., an update or a hotfix capable of solve the error) corresponding to the error.

For example, the electronic device 101 may call a shopping program based on a user input. When the electronic device 101 executes the shopping program, the electronic device 101 may identify that there is a hotfix of v1.20 and v1.21, by accessing the server 106. Here, the hotfix v1.20 and/or v1.21 may be data capable of operating the shopping program, although the hotfix v1.20 and/or v1.21 are or are not updated to drive the shopping program. For example, the hotfix v1.21 may be used for only an operation for performing a payment of the shopping program. In this case, when operating the shopping program, although the electronic device 101 does not update v1.21, the electronic device 101 may perform other operations except for the payment operation. Here, the hotfix may be configured to normally perform other operations, except for a function related to the hotfix, although the electronic device 101 does not perform a corresponding update.

The electronic device 101 may display, on a display 150, a message with information on the hotfix v1.20 and v1.21, which were sought when the electronic device 101 executes the shopping program, and may display a menu (e.g., update 303 and/or later 305) for receiving an input indicating whether the update is to be performed. In displaying message 301, the electronic device 101 may determine whether the shopping program is operated, although the corresponding hotfix v1.20 and v1.21 is not updated. When the shopping program may be operated without performing the update, the electronic device 101 may operate the shopping program rather than displaying the message 301 for the corresponding update based on configuration information. In addition, when the electronic device 101 may operate the shopping program without performing the update, in displaying the message 301, the electronic device 101 may not display the menu (e.g., update 303 and/or later 305) for the user input. For example, after the electronic device 101 displays the message 301 during a designated time (e.g., a designated time between one to three seconds) in a loading operation of the shopping program, the electronic device 101 may remove the message 301. Alternatively, in displaying the message 301, the electronic device 101 may display the message 301 in an area such as a notice bar 311 so as not to disturb the operation of the shopping program.

When the hotfix (e.g., v1.20 and/pr v1.21) identified from the server 106 during the operation of the shopping program performs a necessary operation, the electronic device 101 may display, on the display 150, a message indicating that an update for a corresponding operation is necessary.

Figure 4:
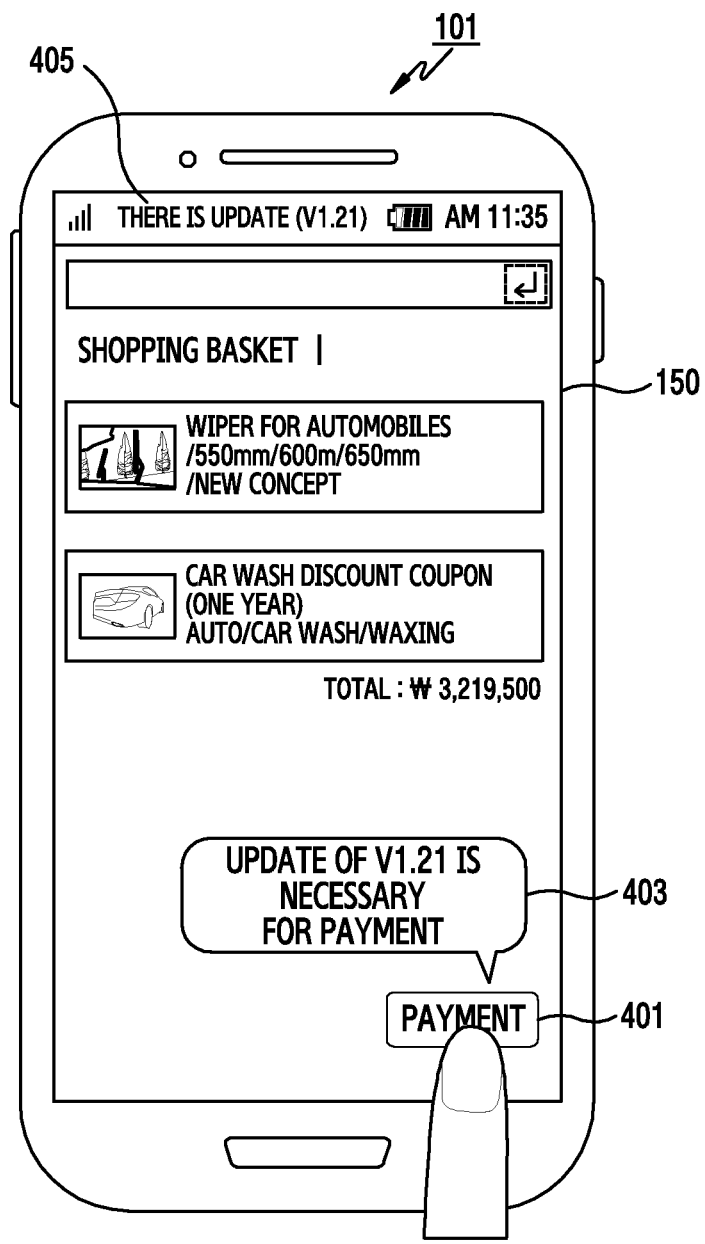
FIG. 4 is a diagram illustrating an electronic device displaying a solution corresponding to an error detected by the electronic device, according to an embodiment of the present invention.

FIG. 4 is a diagram illustrating an electronic device displaying a solution corresponding to an error detected by the electronic device, according to an embodiment of the present invention.

According to an embodiment of the present invention, the electronic device 101 may detect the error during operation of the shopping program. In operating the shopping program, the electronic device 101 may identify whether there is a hotfix of which an update is necessary in the shopping program through the server 106 at a designated time (e.g., a designated time based on the configuration information), when the shopping program is executed or the shopping program is operated. Alternatively, the electronic device 101 may not search for the hotfix which may update in the shopping program until the electronic device 101 detects a specific error during the shopping program operation. The electronic device 101 may select a payment 401 for a payment of items selected during the shopping program operation.

In operating the payment, the electronic device 101 may not perform a designated next operation and detect the error. The electronic device 101 may determine a type of the detected error based on data (or database) of the shopping program or an error process program 135 processing an error generated in an operation. In determining the type of the error, the electronic device 101 may use the communication interface 160 as necessary, and may access the specific server 106, such as, for example, a server related to the shopping program or a server capable of processing data of a program installed in the electronic device 101. The electronic device 101 may determine the type of the error by dividing the error detected during the operation of the shopping program into an error (e.g., an error which may be solved through a designated update such as the hotfix) of which a reason or a solution is clearly determined, and an error of which the reason or the solution is not clearly determined. According to an embodiment of the present invention, when the error (e.g., an identified error) has a clearly determined reason or solution, the electronic device 101 may determine whether the electronic device 101 accesses the server 106 corresponding to the solution and/or whether it receives the solution. When the error (e.g., the unidentified error) does not have a clearly defined reason or solution, the electronic device 101 may transmit information (e.g., information such as an error code, an error generation time, and a process of an error detection time) on the corresponding error to the server 106.

An embodiment of the identified error may be a version conflict. For example, when a version necessary to perform an operation corresponding to a payment 401 in the shopping program is v1.21 and a version of the shopping program installed in the electronic device 101 is lower than v1.21, the electronic device 101 may identify that an error is generated and may identify that the error is an error of the version conflict based on a corresponding error code. The electronic device 101 may access the server 106 according to a configured (e.g., configured to the shopping program, an error process program 135 or a database in the memory 130) error process method, and may output (e.g., display on the display 150) information on the solution (e.g., the hotfix v1.21) for the detected error.

When the electronic device 101 selects the payment 401, the electronic device 101 may display information 403 for the solution of the generated error. In addition, when the electronic device 101 selects the payment 401, in an operation of searching for the generated error and the solution (e.g., the hotfix v1.21) corresponding to the error, the electronic device 101 may identify another hotfix (e.g., v1.20). When the electronic device 101 selects the payment 401, while performing the payment, the electronic device 101 may not display another hotfix except for the necessary hotfix v1.21 on a portion of the shopping program, and may display the information on v1.20 in a position which does not disturb the operation of the shopping program, such as a notice bar 405.

When the electronic device 101 selects update information 403 for the hotfix v1.21 displayed on the display 150, or when the electronic device 101 detects an input for selecting so as to apply the hotfix v1.21, the electronic device 101 may display a designated page (e.g., a page configured to download and/or install the hotfix v1.21 of the server 106). Alternatively, the electronic device 101 may download and install a corresponding hotfix (e.g., the hotfix v1.21) without operations of connecting to and displaying a specific page. When the error generated due to the selection of the payment 401 is solved, the electronic device 101 may perform the corresponding payment operation.

Figure 5:
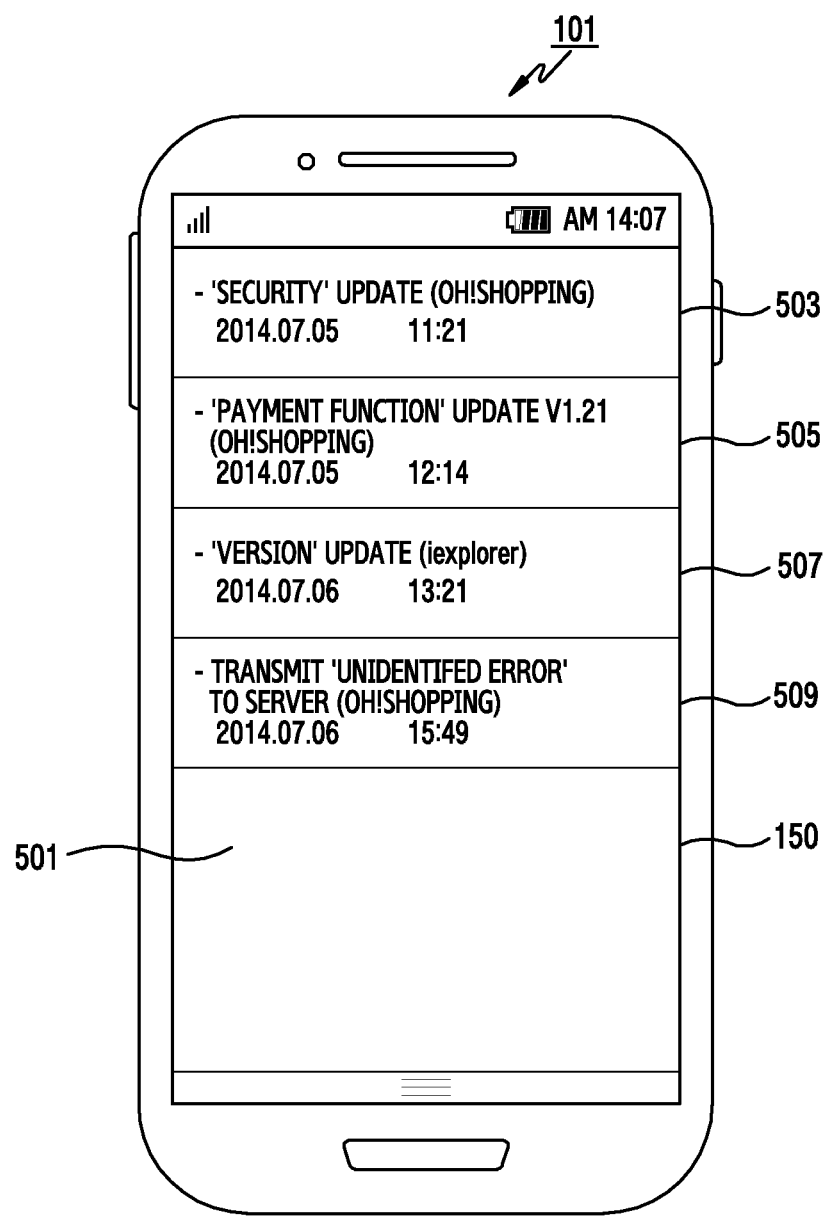
FIG. 5 is a diagram illustrating an electronic device displaying a solution corresponding to the error detected in the electronic device, according to an embodiment of the present invention.

FIG. 5 is a diagram illustrating an electronic device displaying the solution corresponding to the error detected in the electronic device, according to an embodiment of the present invention.

When the electronic device 101 identifies at least one solution corresponding to the error generated during the program operation, the electronic device 101 may display information on the identified solution on the display 150. The electronic device 101 may display the solution in a designated position of the program of which the error is generated, or may display the solution in a specific position, such as, for example a notice bar provided in the display 150. According to an embodiment of the present invention, when the electronic device 101 displays a message indicating existence of the solution corresponding to the error generated during the program operation, the electronic device 101 may not disturb the operation of the corresponding program, and may display information on the necessary message. For example, the electronic device 101 may detect the error during the operation of the shopping program (e.g., oh! shopping), and may determine whether the detected error is an identified error or an unidentified error. The electronic device 101 may determine whether the detected error is the identified error or the unidentified error, based on whether the error may be corrected with reference to the shopping program, the error process program 135 or the database of the electronic device 101, or whether there is a hotfix capable of solving the error by receiving the hotfix from the server 106. The electronic device 101 may determine that the detected error is an error related to a security, which is the identified error, and may determine a corresponding solution a security update (e.g., the hotfix v1.20).

In operating the shopping program, when the electronic device 101 may not stop operation of which the error is generated and continuously performs the operation in a state wherein the security update (e.g., the hotfix v1.20) is not applied in relation to a security service of which an error is detected, the electronic device 101 may not display information on an update of the hotfix v1.20 in a portion (e.g., a pop-up) of the shopping program in the display 150. The electronic device 101 may display information 503 on the corresponding solution security update (e.g., the hotfix v1.20) in a notice bar 501 of the display 150.

When the electronic device 101 performs an operation (e.g., the payment 401 of FIG. 4) of paying for a selected item during operation of the shopping program, the electronic device 101 may detect an error. The electronic device 101 may identify that the error is a version conflict, and may determine that the hotfix v1.21 is a solution for the detected version conflict. When an application of the hotfix v1.21 is absolutely necessary to continuously perform the operation for the payment (e.g., the payment 401 of FIG. 4) selected based on a user input, the electronic device 101 may display the hotfix v1.21 in a designated position (e.g., the message 403 of FIG. 4) or a separated layer (e.g., pop-up) of the shopping program. In addition, the electronic device 101 may display information 503 on the corresponding solution hotfix v1.20 in the notice bar 501 of the display 150. In displaying the information on the hotfix v1.21, the electronic device 101 may identify that v1.21 is information for a payment function, and may display a description of the payment function with reference to the information on update information of the hotfix v1.21.

According to an embodiment of the present invention, when the electronic device 101 performs an operation (e.g., the payment 401 of FIG. 4) of paying for a selected item during operation of the shopping program, the electronic device 101 may detect an error. The electronic device 101 may identify that the error is a version conflict, and may determine that the hotfix v1.21 is a solution for the detected version conflict. When an application of the hotfix v1.21 is absolutely necessary to continuously perform the operation for the payment (e.g., the payment 401 of FIG. 4) selected based on a user input, the electronic device 101 may display the hotfix v1.21 in a designated position (e.g., the message 403 of FIG. 4) or a separated layer (e.g., pop-up) of the shopping program. In addition, the electronic device 101 may display information 505 on the corresponding solution hotfix v1.20 in the notice bar 501 of the display 150. In displaying the information on the hotfix v1.21, the electronic device 101 may identify that v1.21 is information for a payment function, and may display a description of the payment function with reference to the information on update information of the hotfix v1.21.

According to an embodiment of the present invention, the electronic device 101 may determine that the detected error is the unidentified error of which a solution is not clearly provided. The electronic device 101 may obtain information (e.g., information such as an error code, an error generation time and a process of an error detection time) on the unidentified error. The electronic device 101 may transmit the obtained information of the unidentified error to the server 106. The electronic device 101 may display information 509 corresponding to the unidentified error or the transmission of the unidentified error to in the notice bar 501.

In addition, the electronic device 101 may use an Internet program during the shopping program operation. The electronic device 101 may detect an error of the Internet program, which is generated during a use of the Internet program, and the electronic device 101 may determine that the generated error is the identified error. The electronic device 101 may determine a version update as a solution for the error detected during operation of the Internet program. When the electronic device 101 may not apply the version update and continuously uses a function of the Internet program, of which an error is detected, the electronic device 101 may not display a message 507 for the version update in a portion of the operated Internet program and may display the message 507 in the notice bar 501.

Figure 6:
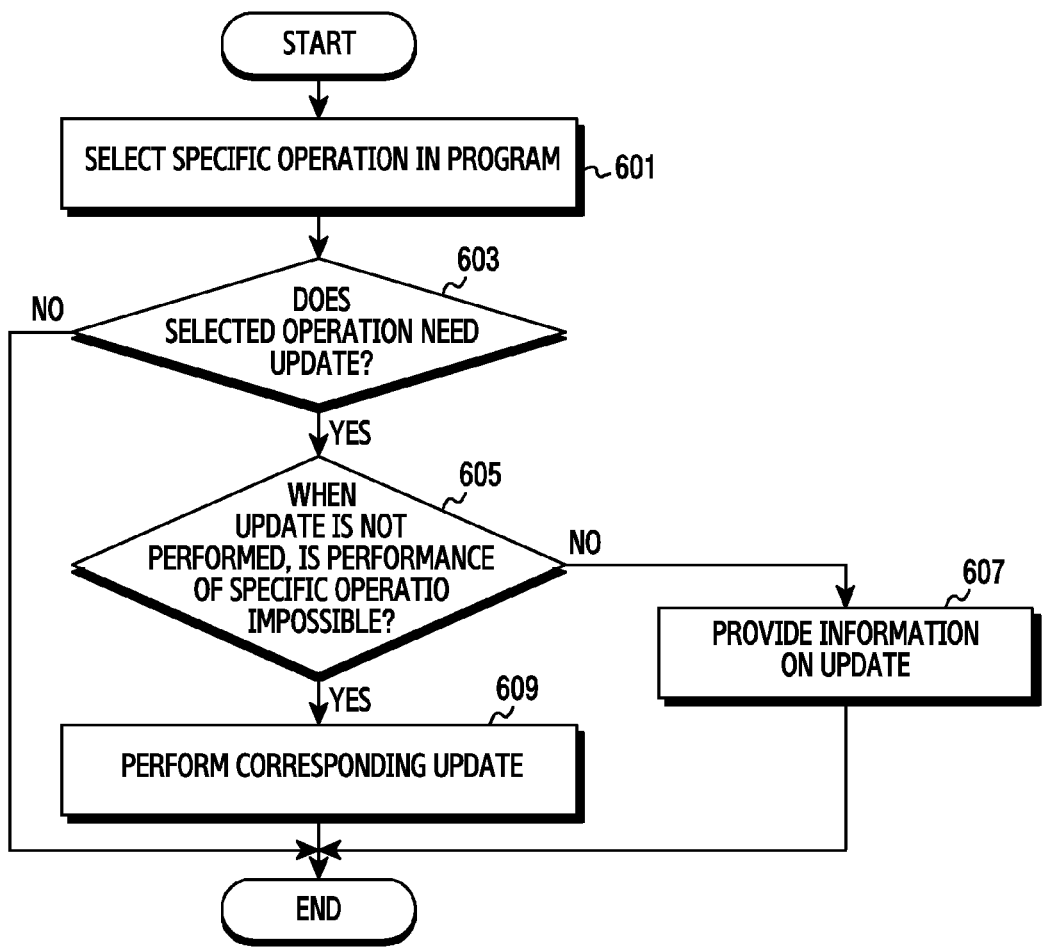
FIG. 6 is a flowchart illustrating processing of an error detected during program performance in the electronic device, according to an embodiment of the present invention.

FIG. 6 is a flowchart illustrating processing of an error detected during a program performance in the electronic device, according to an embodiment of the present invention.

In step 601, in performing a specific program, the electronic device 101 may perform an operation provided from a specific program regardless of version information and based on a user input. According to an embodiment of the present invention, when an update is necessary, or there is a hotfix which is not applied, in performing a function selected based on the user input in a specific program, the electronic device 101 may display information on the corresponding hotfix or the update.

In step 603, the electronic device 101 determines whether the selected operation needs the application of the hotfix or whether the selected operation needs the update of the program. According to an embodiment of the present invention, it is determined whether the operation needs the application of the hotfix or the update of the program by identifying whether the error is generated by selecting the operation. For example, the electronic device 101 may select a payment menu for buying a selected item during a performance of the shopping program. Here, a recent version of hotfix may be applied to a payment function provided from a payment server through the shopping program of the electronic device 101, and the hotfix applied to a payment function of the shopping program in the electronic device 101 may be a hotfix of which a version is previous version of the recent version. In this case, the electronic device 101 may not progress the selected payment function any more and may detect the error.

When the selected operation needs the update, the electronic device 101 determines whether the electronic device 101 can continuously perform a corresponding function although a solution corresponding to the detected error is not applied, in step 605. According to an embodiment of the present invention, the electronic device 101 may detect an error while the electronic device reproduces a moving picture through a reproducing program, and a solution corresponding to the detected error may be a hotfix related to a security. When the electronic device 101 applies the hotfix related to the security, the electronic device 101 may determine whether a problem is generated in reproducing the moving picture of the reproducing program. For example, when the electronic device 101 applies the hotfix related to the security, the electronic device 101 may obtain information on whether an end of the reproducing program is necessary, whether a stop or an end of the reproduced moving picture is necessary, or a disturbance such as a case in which a frame of the reproduced moving picture is lower than a designated frame (e.g., 24 frames/second) is generated in a currently processed operation.

When the electronic device 101 may continuously maintain the performed operation although the update is not performed, the electronic device 101 limits a display of a message for an application of the hotfix, in step 607. The electronic device 101 may change a position of the message. Alternatively, the electronic device 101 may remove the message. For example, when the electronic device 101 applies the hotfix related to the security, it is necessary to execute the hotfix related to the security again after ending the reproducing program. When the currently reproduced moving picture may be reproduced although the hotfix related to the security is not applied, the electronic device 101 may not display a message provided to select whether the electronic device 101 installs the hotfix related to the security on a screen displaying an operation state of the reproducing program and may continuously reproduce the moving picture. The electronic device 101 may display a message for an existence of the hotfix related to the security in a notice bar. In addition, when a fee is charged in downloading the hotfix or applying the hotfix, the electronic device 101 may not provide the message.

When the electronic device 101 cannot progress the performed operation if the electronic device 101 does not solve the generated error, the electronic device 101 applies the hotfix corresponding to the corresponding error, in step 609. The electronic device 101 may apply the hotfix corresponding to the corresponding error based on the user input. According to an embodiment of the present invention, the electronic device 101 may display a menu determining whether the electronic device 101 applies a searched hotfix or an application corresponding to the detected error, in a portion of a specific program displayed on the display 150. The electronic device 101 may apply the hotfix based on the user input.

Figure 7:
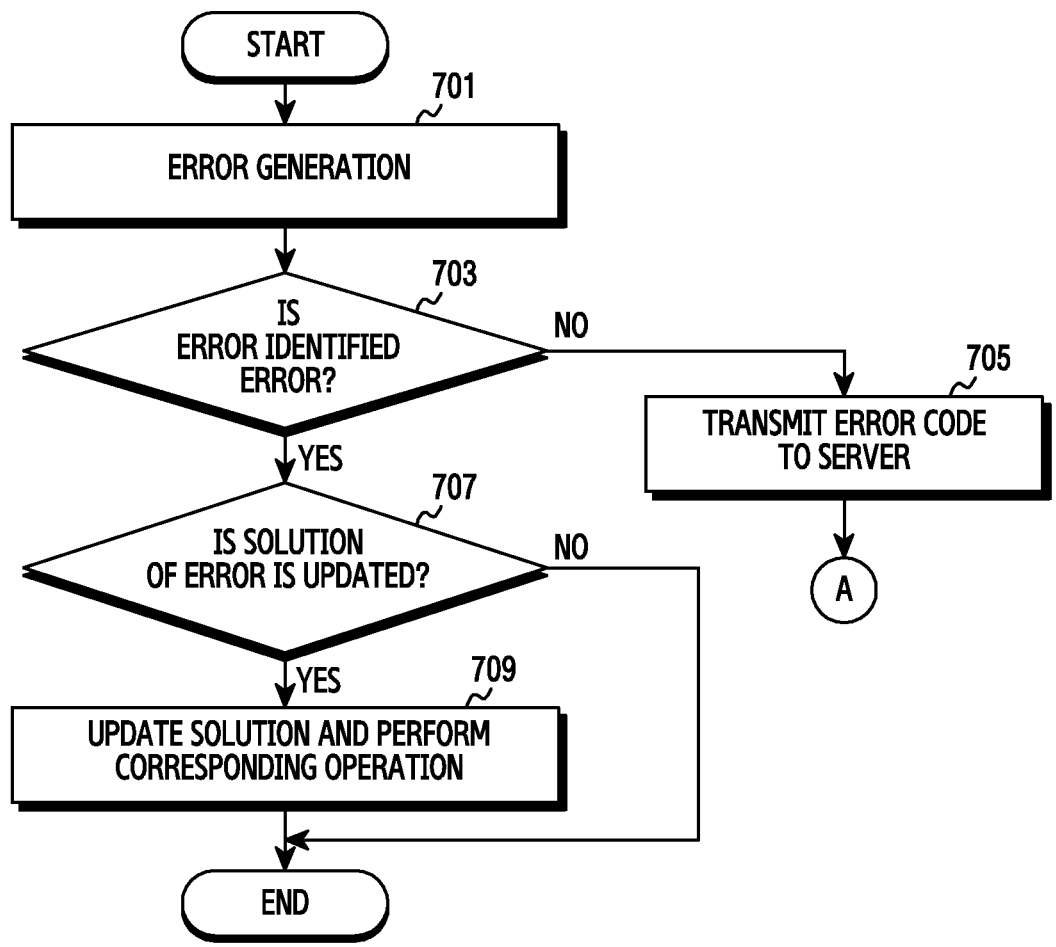
FIG. 7 is a flowchart illustrating processing of an error detected during a program performance in the electronic device, according to an embodiment of the present invention.

FIG. 7 is a flowchart illustrating processing of an error detected during program performance in the electronic device, according to an embodiment of the present invention.

In step 701, the electronic device 101 detects an error generated during a specific program performance. According to an embodiment of the present invention, the electronic device 101 may detect the error generated during the specific program (e.g., the shopping program) operation. Here, the error may be generated, when a specific function (e.g., a payment) is selected based on a user input, and the selected function cannot be performed continuously, and when a data process cannot be normally (or as a expected result) performed while the data is processed in the specific program.

In step 703, the electronic device 101 determines whether the generated error is the identified error or the unidentified error. According to an embodiment of the present invention, the electronic device 101 may determine whether there is a solution for the corresponding error in a program of which the error is generated or the database in the memory 130, based on a detected error code.

When the electronic device 101 determines that there is no solution corresponding to the detected error code, the electronic device 101 transmits information on the detected error to a specific server (e.g., the server 106), in step 705. According to an embodiment of the present invention, the electronic device 101 may transmit, to the server 106, at least one among various pieces of information, such as, for example, an identification code (e.g., error code) of the detected error, information of a time when the error is detected, data processed at the time when the error is detected, and a function of a specific program performed at the time when the error is detected. Here, the server 106 may be a database including at least one solution solving the error, which is connected to the electronic device 101, a server providing a specific program of which an error is generated, and a server such as a market providing a program installed in the electronic device 101.

When the electronic device 101 determines that there is a solution corresponding to the detected error code, the electronic device 101 determines whether the electronic device 101 applies the solution, in step 707. According to an embodiment of the present invention, the electronic device 101 may determine a clear solution (e.g., a hotfix such as update data) correspondingly to the detected error. The electronic device 101 may determine whether the electronic device 101 provides, to a user, a message for an existence of the hotfix based on configuration information. According to an embodiment of the present invention, the electronic device 101 may determine whether it is necessary to apply the hotfix when it is detected that the function of the error is continuously performed. In addition, although the electronic device 101 does not apply the hotfix to perform the function in which the error is generated, the electronic device 101 may determine whether the electronic device 101 can normally perform the function.

In performing the function in which the error is generated, when application of the hotfix is requested, the electronic device 101 may display the message for the existence of the hotfix on the program. When the electronic device 101 applies the hotfix based on user input, the electronic device 101 updates the solution and performs the corresponding operation, in step 709. When the electronic device 101 does not apply the hotfix based on the configuration information or the user input, the electronic device 101 terminates the methodology of FIG. 7. When the electronic device 101 may perform a process of the function in which the error is generated although the electronic device 101 does not apply the hotfix, the electronic device 101 may not display the message indicating existence of the corresponding hotfix on the program, and may perform the corresponding function. When the electronic device 101 does not display the message indicating existence of the corresponding hotfix on the program, the electronic device 101 may output information on the hotfix through a speaker or may display the information on the hotfix in a portion of the program when the electronic device 101 ends the corresponding program. In addition, when the electronic device 101 does not display the information on the hotfix and processes the function in which the error is generated, the electronic device 101 may store the information on the hotfix as a log, and may display on the notice bar.

In step 709, the electronic device 101 applies the hotfix corresponding to the detected error based on the user input. In applying the program by downloading the hotfix, when the electronic device 101 restarts the program or restarts the corresponding function, the electronic device 101 may store data of an end time, and may process the performed function continuously at the time when the error is detected by loading the data stored after the restarting. Alternatively, the electronic device 101 may provide a function that is performed prior to the time when the error is detected.

Figure 8:
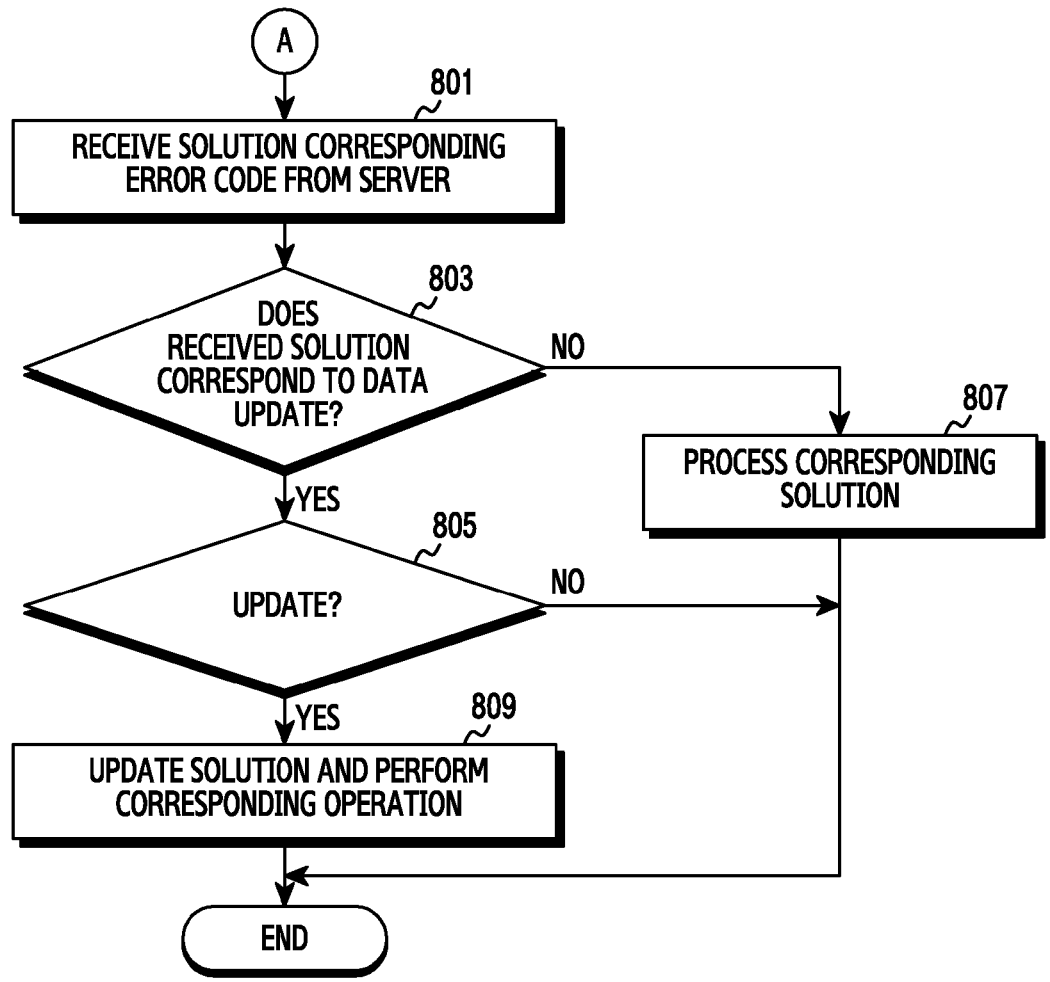
FIG. 8 is a flowchart illustrating processing of an unidentified error detected during program performance in the electronic device, according to an embodiment of the present invention.

FIG. 8 is a flowchart illustrating processing of an unidentified error detected during program performance in the electronic device, according to an embodiment of the present invention.

In step 801, the electronic device 101 receives a solution corresponding to the unidentified error detected during the performance of the program from the server 106. According to an embodiment of the present invention, step 801 may be performed with step 705 in the embodiment of FIG. 7.

In step 803, the electronic device 101 determines whether the solution received from the server 106, which corresponds to the error detected during the performance of the program, is the hotfix, such as the update data. For example, the data that is not the hotfix may be message data for a detected error code.

When the solution received is not the hotfix, the electronic device 101 displays the solution received from the server 106, in step 807. According to an embodiment of the present invention, the solution received from the server 106 corresponding to the detected error by the electronic device 101 may be guide data capable of solving the error, or a command capable of performing a specific operation corresponding to the error. For example, when the server 106 cannot obtain the solution corresponding to the error code received from the electronic device 101, the server 106 may transmit a command so as not to end the program performed in the electronic device 101. According to an embodiment of the present invention, the command may be a command for ignoring the generated error or a command for recovering the performed function to a previous function.

When the solution received is the hotfix, the electronic device 101 determines whether the electronic device 101 applies the hotfix, in step 805. When the electronic device 101 needs the hotfix so as to continuously perform the function processed at the time when the error is detected, the electronic device 101 may display a message indicating existence of the hotfix on a corresponding program. The electronic device may determine whether the electronic device 101 applies the hotfix based on a user input.

When the electronic device 101 applies the hotfix, the electronic device 101 may restart the program or restart the corresponding function, the electronic device 101 may store data of an end time, and may process the performed function continuously at the time when the error is detected by loading the data stored after the restarting. Alternatively, the electronic device 101 may provide a function that is performed prior to the time when the error is detected.

Figure 9:
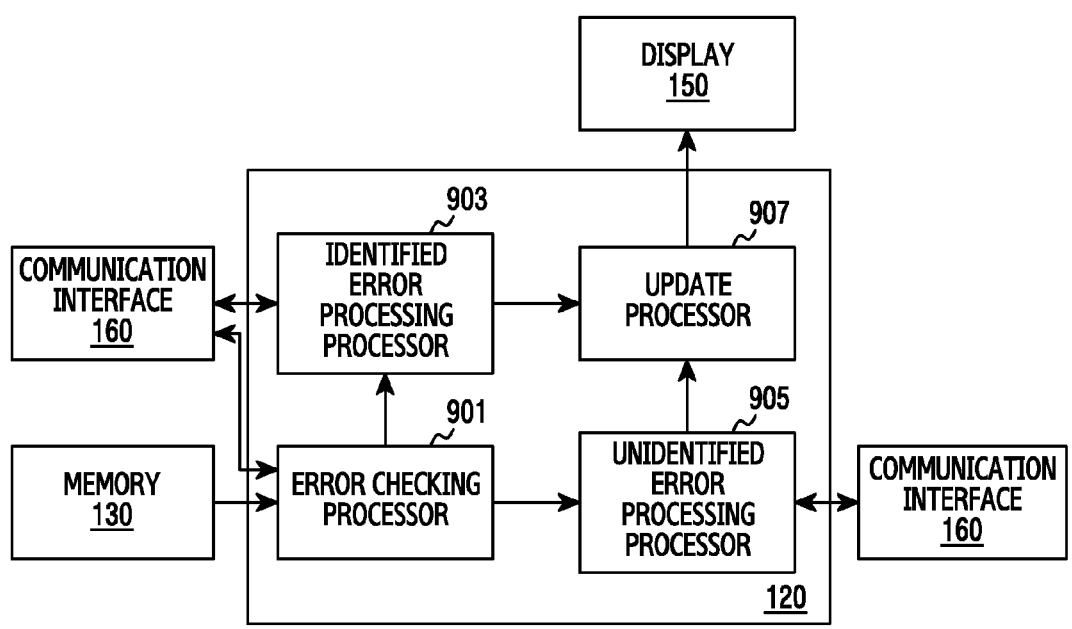
FIG. 9 is a block diagram illustrating a processor for processing an error detected during a performance of a program in the electronic device, according to an embodiment of the present invention.

FIG. 9 is a block diagram illustrating a processor for processing an error detected during a performance of a program in the electronic device, according to an embodiment of the present invention.

Referring to FIG. 9, the electronic device 101 may process the error generated during the performance of the program through at least one processor 120. The processor 120 in the electronic device 101 is a processor for processing the error, and may include at least one of an error checking processor 901, an identified error processing processor 903, an unidentified error processing processor 905, and an update processor 907.

The error checking processor 901 may detect the error generated while the electronic device 101 performs a function of a specific program based on a user input. The error detected by the error checking processor 901 may be generated when the program of the electronic device 101 cannot continuously process the processed data. The error checking processor 901 may detect a state in which data of a corresponding operation cannot be processed for a designated time or more, when the electronic device 101 executes the program, when the program performs a designated function, a specific function is selected based on the user input, and the like. The error checking processor 901 may search for the detected error through the database in a corresponding program or the memory 130 of the electronic device 101, or at least one server 106 connected through the communication interface 160. When the error checking processor 901 obtains designated information corresponding to the detected error, the error checking processor 901 may determine that the error is the identified error, and when the error checking processor 901 cannot obtain the designated information corresponding to the detected error, the error checking processor 901 may determine that the error is the unidentified error.

The identified error processing processor 903 may determine whether the identified error processing processor 903 applies a solution determined through a database of the program of which the error is generated or the database in the memory 130. When the identified error processing processor 903 does not apply the obtained solution, the identified error processing processor 903 may determine whether a function of which an error is generated cannot be used. When a corresponding function can be used although the identified error processing processor 903 does not apply the obtained solution, the identified error processing processor 903 may control not to display a message provided to determine whether a corresponding solution is to be applied. According to an embodiment of the present invention, when the identified error processing processor 903 does not apply the corresponding solution, the identified error processing processor 903 may skip (e.g., does not perform a special operation in response to the error) the generated error and may continuously perform the function performed at an error generation time. When the identified error processing processor 903 does not apply the solution and the identified error processing processor 903 cannot continuously perform the function of which the error is generated, the identified error processing processor 903 may display information on the solution. When the identified error processing processor 903 determines the application of the solution based on the user input, the identified error processing processor 903 may perform the update process in the update processor 907.

When the detected error is determined as the unidentified error, the unidentified error processing processor 905 may transmit information on the detected error to the designated server 106 connected through the communication interface 160. Here, the unidentified error may be an unexpected error, such as a use of the memory 130 which is not allocated, and a use of a position of the memory 130 which is abnormal. In transmitting the information on the detected error, the unidentified error processing processor 905 may transmit, to the server 106, at least one of various pieces of information such as an identification code (e.g., error code) of the error, information of a time when the error is detected, data processed at the time when the error is detected, and a function of a specific program performed at the time when the error is detected. The unidentified error processing processor 905 may receive, from the server 106, data (e.g., solution) related to the transmitted error.

When the update processor 907 determines that the solution designated based on the detected error is applied, the update processor 907 may apply the solution in the memory 130 of the electronic device 101 or the solution received from the server 106. In addition, the update processor 907 may display information related to the solution on the display 150, such as displaying a web page capable of downloading a designated solution. When the data provided as the solution is information (e.g., a guide) that does not need an update of the program, the update process 907 may display a corresponding content to a performed program or a new layer. When the update processor 907 applies the solution, the update processor 907 may continuously perform the function of which the error is generated.

Various embodiments performed by the electronic device 101 may be operations that are performed under the control of the processor 120. The electronic device 101 may include a module, separate from the processor 120, which is programmed to control the various embodiments of the present invention. The separate module programmed to control the various embodiments of the present invention may operate under a control of the processor 120.

Each of the above described elements of the electronic device, according to various embodiments of the present invention, may include one or more components, and the name of a corresponding element may vary according to the type of electronic device. The electronic device, according to various embodiments of the present invention, may include at least one of the above described elements and may exclude some of the elements or further include other additional elements. Further, some of the elements of the electronic device, according to various embodiments of the present invention, may be coupled to form a single entity while performing the same functions as those of the corresponding elements before the coupling.

According to various embodiments of the present invention, at least some of the devices or methods may be implemented in the form of hardware, software, firmware, or any combination (e.g., module or unit) of at least two of hardware, software, and firmware. The "module", for example, may be interchangeably used with the term "unit", "logic", "logical block", "component", "circuit" or the like. A module may be the smallest unit of integrated components or a part thereof. In addition, a module may be the smallest unit that performs one or more functions in various embodiments of the present disclosure or a part thereof. A module may be mechanically or electronically implemented. For example, a module, according to an embodiment of the present invention, may include at least one of an application-specific integrated circuit (ASIC) chip, a field programmable gate array (FPGA), and a programmable-logic device for performing operations, which have been known or are to be developed hereinafter. If implemented in software, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform methods, according to various embodiments of the present invention. When a command is executed by one or more processors (for example, the processor 120), the one or more processors may execute a function corresponding to the command. The computer-readable storage medium may, for example, be the memory 230. At least a part of the programming module may, for example, be implemented (e.g., executed) by the processor 220. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the above may form a memory in which the program is stored. Further, a plurality of such memories may be included in the electronic device. In addition, the program instructions may include high class language codes, which can be executed in a computer by using an interpreter, as well as machine codes made by a compiler.

According to various embodiments of the present invention, a computer-readable storage medium may be included, which stores a program for performing an operation of identifying a generation of an error while a function of a program is performed and an operation of displaying, on the display, a message for an existence of a solution corresponding to the error.

In addition, the program may be stored in an attachable storage device capable of accessing the electronic device through a communication network such as the Internet, an intranet, a local area network (LAN), a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations, according to various embodiments of the present invention.

Any of the modules or programming modules, according to various embodiments of the present invention, may include at least one of the above described elements, exclude some of the elements, or further include other additional elements. The operations performed by the modules, programming module, or other elements may be executed in a sequential, parallel, repetitive, or heuristic manner. Further, some operations may be executed according to another order or may be omitted, or other operations may be added.

While the invention has been shown and described with reference to certain embodiments thereof, it will be understood by those skilled in the art that various changes in form and detail may be made therein without departing from the sprit and scope of the invention as defined by the appended claims.

What is claimed is:
1. An electronic device comprising:
a display; and
a processor operatively coupled to the display, the processor configured to:
    detect a first update and a second update while a function of a program is being executed in the electronic device and a menu corresponding to the function of the program is being displayed on the display, wherein the first update and the second update correspond to each of a plurality of errors;

determine whether the first update or the second update is required for processing the function of the program;

in response to determining that the first update is required for processing the function of the program, control the display to display a first message associated with the first update and a second message associated with the second update, the first message being highlighted relative to the second message; and in response to detecting that the first message is selected, apply the first update for processing the function of the program, wherein the first message is highlighted relative to the second message by displaying the first message near the menu corresponding to the function of the program and by displaying the second message in a notice bar of the display or for a predetermined time.

2. The electronic device of claim 1, wherein the processor is further configured to change a position where the first message is displayed, when the processor continuously performs the function of the program while the first update is detected.

3. The electronic device of claim 1, wherein the processor is further configured to categorize an error among the plurality of errors as an identified error having a specified method of solving the error or an unidentified error having no specified method of solving the error.

4. The electronic device of claim 1, wherein the processor is further configured to determine whether the first update or second update corresponding to the each of the plurality of errors is applied.

5. The electronic device of claim 1, wherein the processor is further configured to change a position where the first message is displayed, when the program or the function of the program is required to restart to apply the update.

6. The electronic device of claim 1, wherein, when an error among the plurality of errors is an unidentified error, the processor is further configured to request a server for information on solution determined based on at least one of a code of the error, a generation time of the error, and data processed at a detection time of the error, when the error is an unidentified error.

7. The electronic device of claim 1, wherein the processor is further configured to apply the second update when the second message is selected.

8. The electronic device of claim 1, wherein the processor is further configured to control the display to display the first message on a portion of the program or a new layer, when the first update is necessary to continuously perform the function.

9. The electronic device of claim 1, wherein the processor is further configured to determine, as the first update or the second update, at least one of a hotfix related to the error, an installation of update data, and a connection to an Internet page related to an error among the plurality of errors.

10. A method of operating an electronic device, comprising:

detecting, by a processor of the electronic device, a first update and a second update while a function of a program is being executed in the electronic device and a menu corresponding to the function of the program is being displayed on the display, wherein the first update and the second update correspond to each of a plurality of errors;

determining, by the processor of the electronic device, whether the first update or the second update is required for processing the function of the program;

in response to determining that the first update is required for processing the function of the program, displaying, on a display of the electronic device, a first message associated with the first update and a second message associated with the second update, the first message being highlighted relative to the second message; and in response to detecting that the first message is selected, applying the first update for processing the function of the program, wherein the first message is highlighted relative to the second message by displaying the first message near the menu corresponding to the function of the program and by displaying the second message in a notice bar of the display or for a predetermined time.

11. The method of claim 10, wherein displaying the message comprises changing a position where the first message is displayed, when the function of the program is continuously performed while the first update is detected.

12. The method of claim 10, wherein an error among the plurality of errors is categorized as an identified error having a specified method of solving the error, or an unidentified error having no specified method of solving the error.

13. The method of claim 10, further comprising determining whether the first update or second update corresponding to the each of the plurality of errors is applied.

14. The method of claim 10, further comprising changing a position where the first message is displayed, when the program or the function of the program is required to restart to apply the update.

15. The method of claim 10, wherein, when an error among the plurality of errors is an unidentified error, information on solution determined based on at least one of a code of the error, a generation time of the error, and data processed at a detection time of the error is requested from a server.

16. The method of claim 10, further comprising applying the second update when the second message is selected.

17. The method of claim 10, further comprising displaying the first message on a portion of the program or a new layer, when the first update is necessary to continuously perform the function.

18. The method of claim 10, wherein the first update or the second update is at least one of a hotfix related to the error, an installation of update data, and a connection to an Internet page related to the error.

19. A non-transitory computer-readable storage medium in which a program for performing operations is stored, the operations comprising:

detecting a first update and a second update while a function of a program is being executed in the electronic device and a menu corresponding to the function of the program is being displayed on the display, wherein the first update and the second update correspond to each of a plurality of errors;

determining whether the first update or the second update is required for processing the function of the program;

in response to determining that the first update is required for processing the function of the program, displaying a first message associated with the first update and a second message associated with the second update, the first message being highlighted relative to the second message; and in response to detecting that the first message is selected, applying the first update for processing the function of the program, wherein the first message is highlighted relative to the second message by displaying the first message near the menu corresponding to the function of the program and by displaying the second message in a notice bar of the display or for a predetermined time.

\* \* \* \* \*